US009164913B1

(12) United States Patent
Tawri et al.

(10) Patent No.: US 9,164,913 B1
(45) Date of Patent: Oct. 20, 2015

(54) METHOD AND SYSTEM FOR OFFLOADING COPY ON WRITE OPERATIONS

(75) Inventors: Deepak Tawri, Pune (IN); Sanjeev Jorapur, San Jose, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 430 days.

(21) Appl. No.: 13/447,521

(22) Filed: Apr. 16, 2012

(51) Int. Cl.
*G06F 15/167* (2006.01)
*G06F 12/00* (2006.01)
*G06F 3/06* (2006.01)
*G06F 12/08* (2006.01)

(52) U.S. Cl.
CPC .............. *G06F 12/0866* (2013.01); *G06F 3/06* (2013.01)

(58) Field of Classification Search
CPC ......... G06F 15/167; G06F 12/00; G06F 3/06; G06F 12/0866; G06F 12/0223
USPC ........................................... 710/306; 709/212
See application file for complete search history.

(56) References Cited

U.S. PATENT DOCUMENTS

| 5,937,169 | A  | * | 8/1999 | Connery et al. .............. 709/250 |
| 7,032,089 | B1 | * | 4/2006 | Ranade et al. ................ 711/161 |
| 7,542,987 | B2 | * | 6/2009 | Lubbers et al. ....................... 1/1 |
| 7,610,319 | B1 | * | 10/2009 | Kekre et al. ........................... 1/1 |
| 7,849,208 | B2 | * | 12/2010 | Elzur et al. .................... 709/232 |
| 8,341,286 | B1 | * | 12/2012 | Craft et al. .................... 709/232 |
| 8,539,112 | B2 | * | 9/2013 | Craft et al. .................... 709/250 |
| 2001/0047433 | A1 | * | 11/2001 | Boucher et al. ............... 709/250 |
| 2003/0217114 | A1 | * | 11/2003 | Obara et al. .................. 709/214 |
| 2008/0126578 | A1 | * | 5/2008 | Krithivas ........................... 710/4 |
| 2010/0049932 | A1 | * | 2/2010 | Tan et al. ...................... 711/162 |
| 2011/0213854 | A1 | * | 9/2011 | Haviv ............................ 709/212 |
| 2012/0047327 | A1 | * | 2/2012 | Ueda ............................. 711/114 |
| 2012/0131235 | A1 | * | 5/2012 | Nageshappa et al. ........... 710/22 |
| 2013/0041977 | A1 | * | 2/2013 | Wakamiya .................... 709/217 |
| 2013/0054533 | A1 | * | 2/2013 | Hao et al. ...................... 707/649 |
| 2013/0254481 | A1 | * | 9/2013 | Usgaonkar et al. ........... 711/114 |
| 2013/0275674 | A1 | * | 10/2013 | Rangachari et al. .......... 711/114 |

* cited by examiner

*Primary Examiner* — Tim T Vo
*Assistant Examiner* — Christopher A Daley
(74) *Attorney, Agent, or Firm* — Klein, O'Neill & Singh, LLP

(57) ABSTRACT

Machine implemented method and system for processing a write request for a copy on write (COW) enabled write operation to write to a logical unit number (LUN) for which a replicated LUN exists is provided. An adapter coupled to a computing system and interfacing with the LUN and the replicated LUN receives the write request having an indicator indicating that the write request is for the COW enabled write operation. The adapter issues a read request to the LUN to read previous information from the LUN; temporarily stores the previous information at a memory storage location of the adapter; writes the previous information to the replicated LUN; writes the information based on the write request to the LUN; and notifies the computing system indicating that the write request for the COW enabled write operation has been completed.

19 Claims, 5 Drawing Sheets

METHOD AND SYSTEM FOR OFFLOADING COPY ON WRITE OPERATIONS

TECHNICAL FIELD

The present invention relates to computing systems.

BACKGROUND

Storage space at a storage device is presented as a storage volume having at least a logical unit number (LUN) for reading and writing information. A snapshot is a point in time copy of the storage volume. A snapshot is typically created using a pre-designated space for the snapshot. When the snapshot is first created, only meta-data about where original data is stored is copied. No physical copy of the data is done at the time the snapshot is created. Therefore, the creation of the snapshot is almost instantaneous. The snapshot copy then tracks the changing blocks on the original storage volume as writes to the original volume are performed. The original data that is being written to is copied into the designated storage pool that is set aside for the snapshot before original data is overwritten, hence the name "copy-on-write" (or COW).

Before a write is allowed to a block, copy-on-write operation moves the original data block to the snapshot storage. This keeps the snapshot data consistent with the exact time the snapshot was taken. Read requests to the snapshot volume of the unchanged data blocks are redirected to the original volume, while read requests to data blocks that have been changed are directed to the "copied" blocks in the snapshot. Continuous efforts are being made to efficiently execute COW enabled write operations.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

In one embodiment, a machine implemented for processing a write request for a copy on write (COW) enabled write operation to write to a logical unit number (LUN) for which a replicated LUN exists is provided. The method includes receiving the write request by an adapter coupled to a computing system and interfacing with the LUN and the replicated LUN. The write request includes an indicator indicating that the write request is for the COW enabled write operation.

The adapter issues a read request to the LUN to read previous information from the LUN; temporarily stores the previous information at a memory storage location of the adapter; writes the previous information to the replicated LUN and the information based on the write request to the LUN; and generates an interrupt for the computing system indicating that the write request for the COW enabled write operation has been completed.

In another embodiment a system is provided. The system includes a computing system interfacing with an adapter; a logical unit number (LUN) presented to the computing system for writing information at a storage device via the adapter; and a replicated LUN for storing a point in time copy of the LUN.

The adapter is configured to (i) receive a write request with an indicator indicating that the write request is for the COW enabled write operation to write to the LUN; and (ii) issue a read request to the LUN to read previous information from the LUN; (iii) temporarily store the previous information at a memory storage location of the adapter; (iv) write the previous information to the replicated LUN; (v) write the information based on the write request to the LUN; and (vi) generate an interrupt for the computing system indicating that the write request for the COW enabled write operation has been completed.

In yet another embodiment, a machine implemented for processing a write request for a copy on write (COW) enabled write operation to write to a logical unit number (LUN) for which a replicated LUN exists is provided. A device coupled to a computing system and interfacing with the LUN and the replicated LUN receives the write request. The device issues a read request to the LUN to read previous information from the LUN; writes the previous information to the replicated LUN after reading the previous information in response to the read request; writes the information based on the write request to the LUN; and notifies the computing system indicating that the write request for the COW enabled write operation has been completed.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments relating to selectable initialization for adapters now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
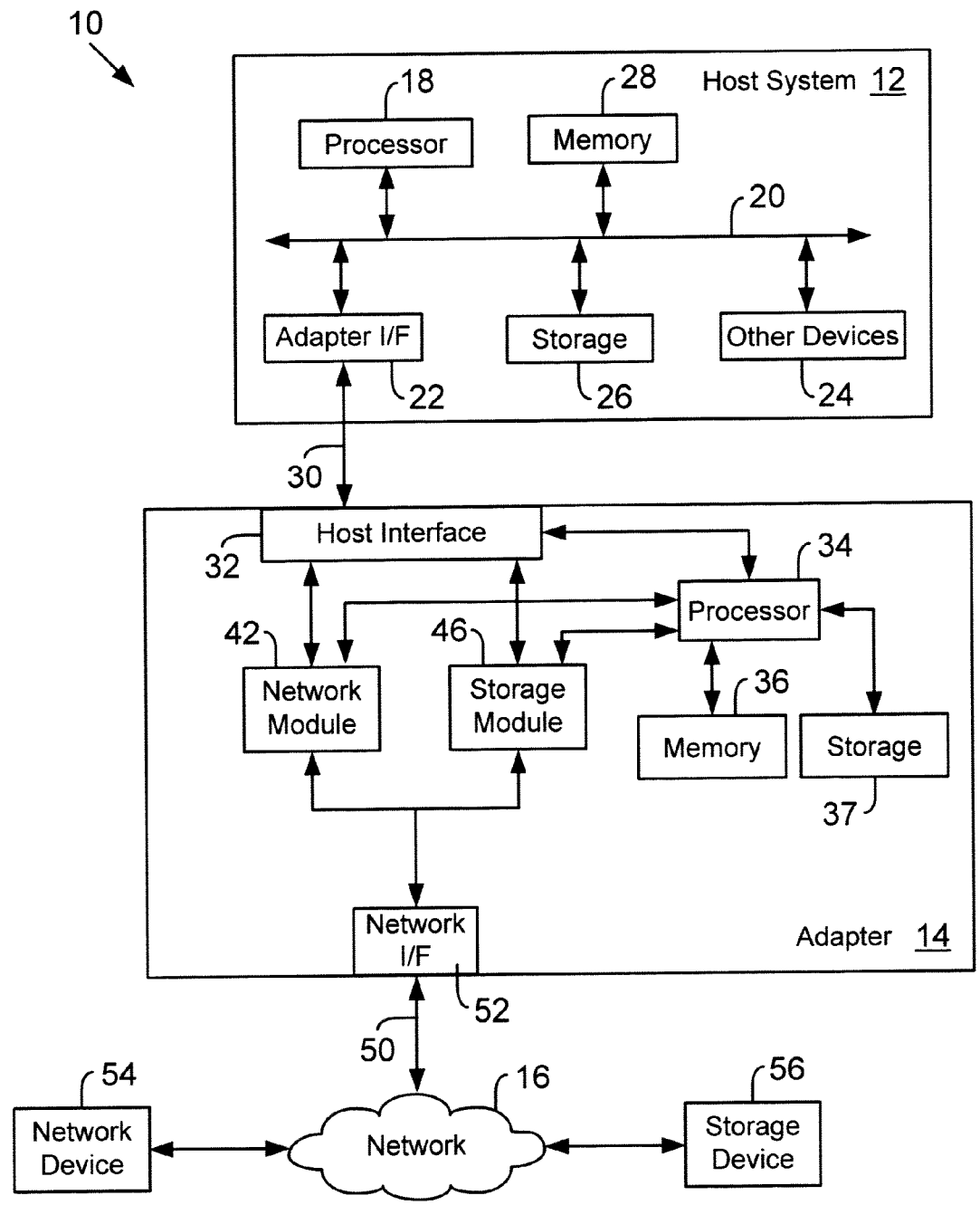
FIG. 1A is a functional block diagram of a computing system coupled to a network through an adapter, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product computer-readable media. The computer program product may be computer storage media, readable by a computer device, and encoding a computer program of instructions for executing a computer process. The computer program product may also be a propagated non-transitory signal on a carrier, readable by a computing system, and encoding a computer program of instructions for executing a computer process.

System:

FIG. 1A is a block diagram of a system 10 configured for use with the present embodiments. System 10 includes a computing system 12 (may also be referred to as "host system 12") coupled to an adapter (may also be referred to as "device") 14 that interfaces with a network 16. The network 16 may include, for example, additional computing systems, servers, storage systems and other devices. The computing system 12 may operate as a server executing a plurality of applications, for example, database applications for managing client information, file systems for storing data and others. The embodiments described herein are not limited to any particular application type executed by computing system 12.

The computing system 12 may include one or more processors 18, also known as a central processing unit (CPU). The processor 18 executes computer-executable process steps and interfaces with an interconnect 20, may also be referred to as a computer bus 20. Processor 18 may be, or may include, one or more programmable general-purpose or special-purpose hardware based microprocessors, digital signal processors (DSPs), programmable controllers, application specific integrated circuits (ASICs), programmable logic devices (PLDs), or the like, or a combination of such had are devices. The computer bus 20 may be, for example, a system bus, a Peripheral Component Interconnect (PCI) bus (or PCI Express bus), a HyperTransport industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

An adapter interface 22 enables the computing system 12 to interface with the adapter 14, as described below. The computing system 12 also includes other devices and interfaces 24, which may include a display device interface, a keyboard interface, a pointing device interface, etc. The details of these components are not germane to the inventive embodiments.

The computing system 12 may further include a storage device 26, which may be for example a hard disk, a CD-ROM, a non-volatile memory device (flash or memory stick) or any other non-transitory, computer readable media. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces to the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, a link 30 and the adapter interface 22 couple the adapter 14 to the computing system 12. The adapter 14 may be configured to handle both network and storage traffic. Various network and storage protocols may be used to handle network and storage traffic, for example, Ethernet, Fibre Channel, Fibre Channel over Ethernet (FCoE), InfiniBand, Remote Direct Memory Access (RDMA), iSCSI (Internet Small Computer System Interface) and others.

The adapter 14 interfaces with the computing system 12 via the link 30 and a host interface 32. In one embodiment, the host interface 32 may be a Peripheral Component Interconnect (PCI) Express interface coupled to a PCI Express link (for example, link 30). The adapter 14 may also include a processor 34 that executes firmware instructions out of memory 36 to control overall adapter 14 operations. Memory 36 may also include the process steps, according to one embodiment.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 that interfaces with network 16 via a network interface 52 and link 50 for handling network traffic. In one embodiment, the network interface 42 includes logic and circuitry for handling network packets, for example, Ethernet or any other type of network packets. The network module 42 may include memory buffers (not shown) to temporarily store information received from other network devices 54 and transmitted to other network devices 54.

The adapter 14 may also include a storage module 46 for handling storage traffic to and from storage devices 56. The storage module 46 may further include memory buffers (not shown) to temporarily store information received from the storage devices 56 and transmitted by the adapter 14 to the storage devices 56. In one embodiment, the storage module 46 is configured to process storage traffic according to the Fibre Channel storage protocol, or any other protocol.

The adapter 14 also includes a network interface 52 that interfaces with a link 50 via one or more ports (not shown). The network interface 52 includes logic and circuitry to receive information via the link 52 and pass it to either the network module 42 or the storage module 46.

An example of adapter 14 is a converged network adapter (CNA) provided by QLogic Corporation, the assignee of the present application. The embodiments disclosed herein are not limited to a CAN and may be implemented in a host bus adapter (HBA), a host channel adapter, a network adapter or any other similar device/apparatus.

Figure 1B:
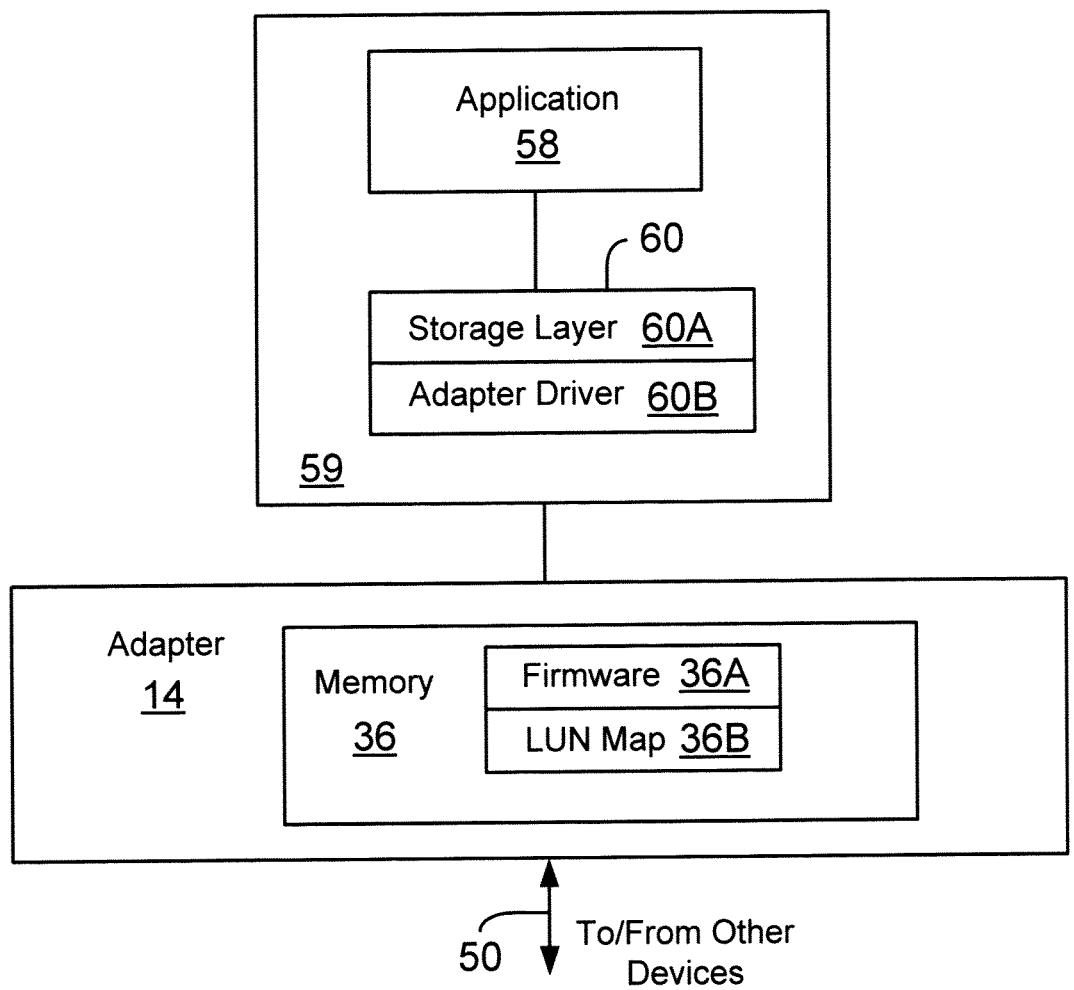
FIG. 1B shows an architecture used by the system of FIG. 1A, according to one embodiment.

FIG. 1B shows an example of an architecture that may be used by system 10, according to one embodiment. An operating system 59 is executed by computing system 12 that includes a Windows® based operating system or non-Windows based operating system, for example, Solaris, Linux and others. Application 58 may be a file system, a database application or any other processor executable instructions that may be used to initiate an input/output (I/O) request to read and write information at a storage device (not shown). Storage space at the storage device may be presented as logical space, referred to herein as a logical unit number (LUN). A LUN is typically presented to application 58 to read and write information. Details of presenting a LUN are not germane to the embodiments disclosed herein.

An I/O request from application 58 is received by an I/O subsystem 60. The I/O sub-system 60 may include one or more processor executable layers, for example, a storage layer 60A (for example, a SCSI layer) that converts a request generated by application 58 to conform with a storage protocol, for example, the SCSI protocol.

The I/O subsystem 60 may also include an adapter driver layer 60B (not shown). The nature of the adapter driver layer 60B is based on the adapter type. For example, if adapter 14 is an FCoE adapter, then the adapter driver layer 60B is an FCoE driver. If the adapter is a Fibre Channel HBA, then the adapter driver layer 60B is a Fibre Channel driver. Typically, an adapter provider, for example, QLogic Corporation provides the adapter driver layer that is executed by computing system 12.

The adapter driver layer 60B interfaces with firmware 36A executed by adapter 14 out of memory 36 for controlling the overall functionality of adapter 14.

Adapter 14 may also store a LUN map 36B at memory 36 or any other location. Details regarding the LUN map 36B are provided below.

Figure 1C:
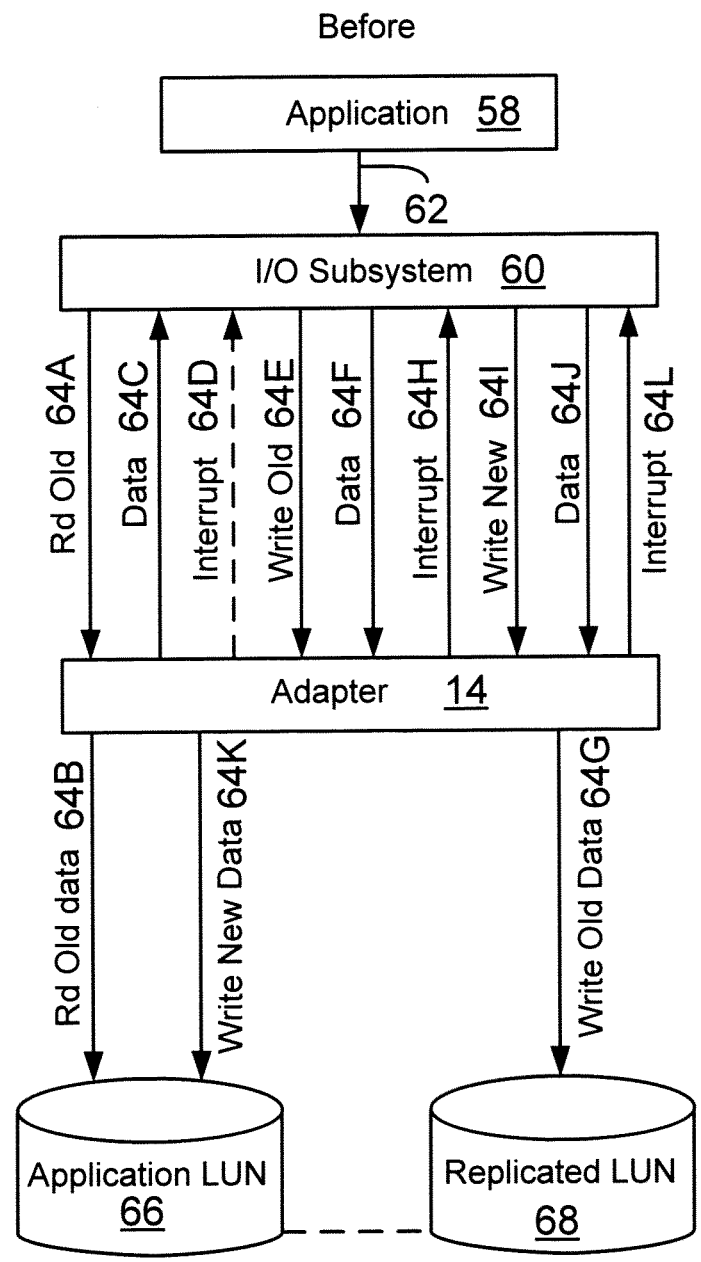
FIG. 1C shows a conventional solution for processing copy on-write (COW) enabled write requests.

FIG. 1C shows a conventional technique (labeled as "Before") for processing a copy on write (COW) enabled write command to write to an application LUN 66 for which a replicated LUN 68 already exists. The application LUN 66 is typically presented to application 58 to read and write information from. The information written at the application LUN 66 is replicated and stored using replicated LUN 68.

The LUNs 66 and 68 are typically accessed and controlled by target adapters, similar to adapter 14. The target adapters have ports that are assigned unique identifiers; for example, worldwide port numbers (WWPNs). The WWPNs are typically used by adapter 14 to address the target ports for sending commands/information to application LUN 66 and the replicated LUN 68.

In a conventional system, a write command 62 is generated by application 58 and sent to the I/O subsystem 60. The I/O subsystem 60 translates the write command to a write enabled COW command. The I/O subsystem 60 then sends a read command (labeled as "Rd Old") 64A to adapter 14. This command is to read old data from the application LUN 66 from the same location where new data is to be written in response to command 62. Based on the read command 64A, adapter 14 issues a read command 64B to application LUN 66. Data 64C associated with the read command is read and provided to the I/O subsystem 60 and a first interrupt 64D is generated to notify the I/O subsystem 60 that the old data has been read.

Thereafter, the I/O subsystem 60 issues a write command 64E to adapter 14 to write the old data 64F. The old data 64F may be the same as data 64C provided by adapter 14. Adapter 14 then issues a write command 64G to write the old data at the replicated LUN 68. After the old data is written, a second interrupt 64H is generated to notify the I/O subsystem 60 that the old data has been written. It is noteworthy that the old data is read and provided to host system 12 via link 30 and then resent to the adapter 14 via link 30. Sending the same data back and forth via link 30 is inefficient and wastes computing resources.

The I/O subsystem 60 then issues a new write command 64I to adapter 14 to write new data 64J to the application LUN 66. Adapter 14 then issues a write command 64K to write the new data 64J to the application LUN 66. After the new data is written to application LUN 66, a third interrupt 64L is issued to the I/O subsystem 60 to notify the I/O subsystem 60 that the write command has been executed. The I/O subsystem 60 then notifies application 60 of the completion.

The conventional system to implement a COW enabled write command is undesirable because it takes too many commands, data transfer operations for transferring the same data via link 30 and various interrupts. This wastes processing resources and time. The embodiments described herein provide an efficient method and system for processing COW enabled write commands, as described below with respect to FIGS. 1D and 2.

Figure 1D:
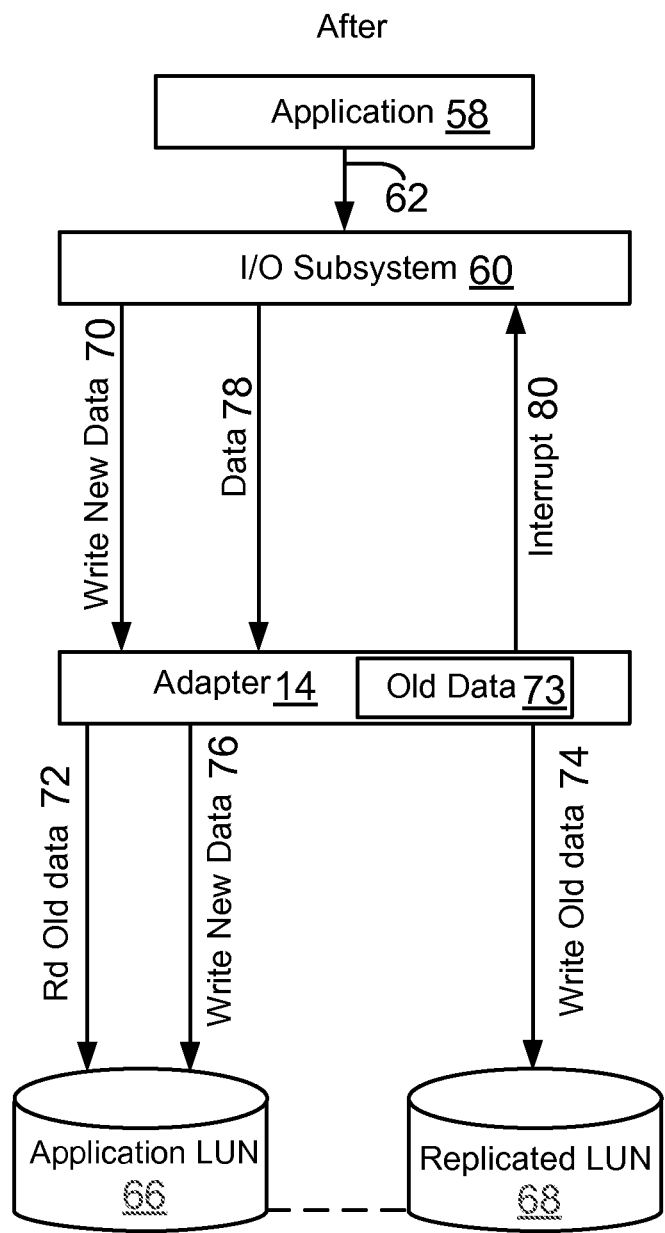
FIG. 1D shows a system for processing COW enabled write requests, according to one embodiment.

FIG. 1D (labeled as "After") shows an example of processing a write command 62, according to one embodiment. The write command 62 is sent by application 58 to the I/O subsystem 60 that converts the write command 62 to a COW enabled write command. The I/O subsystem 60 then sends the COW enabled write command 70 to adapter 14. The new data 78 that needs to be written is also sent to adapter 14 or retrieved by adapter 14 from a memory location.

The adapter 14 then issues a read command 72 to application LUN 66. The old data 73 is then read and temporarily stored by adapter 14 at local memory 36. The adapter 14 writes the old data 73 to replicated LUN 68 using a write command 74. LUN map 36B (FIG. 1B) is used by adapter 14 to issue the write command to the replicated LUN 68. LUN map 36B stores an identifier (for example, LUN identifier) that identifies replicated LUN 68 and a WWPN for a target port that is used to access the replicated LUN 68. Adapter 14 uses this information to generate the write command 74 for writing to the replicated LUN 68.

The adapter 14 then issues another write command 76 to write the new data to application LUN 66. Thereafter, a single interrupt 80 is sent to the I/O subsystem 60.

Compared to the conventional process of FIG. 1C where three interrupts and multiple commands are used between I/O subsystem 60 and adapter 14 to complete a COW enabled write operation, only one interrupt may be used to complete the COW enabled write operation using the embodiment of Figure 1D.

Furthermore, the embodiments disclosed herein reduce the number of transactions over link 30. For example, in the embodiment of FIG. 1D, the old data 64C that is read from the application LUN 66 does not have to be transferred via link 30 from the adapter 14 to the host system 12 and then transferred back to the adapter 14 for writing to the replicated LUN 68. The old data 64F that is written to application LUN 68 in FIG. 1O also does not have to be transferred via link 30 in the embodiment of FIG. 1D.

Figure 2:
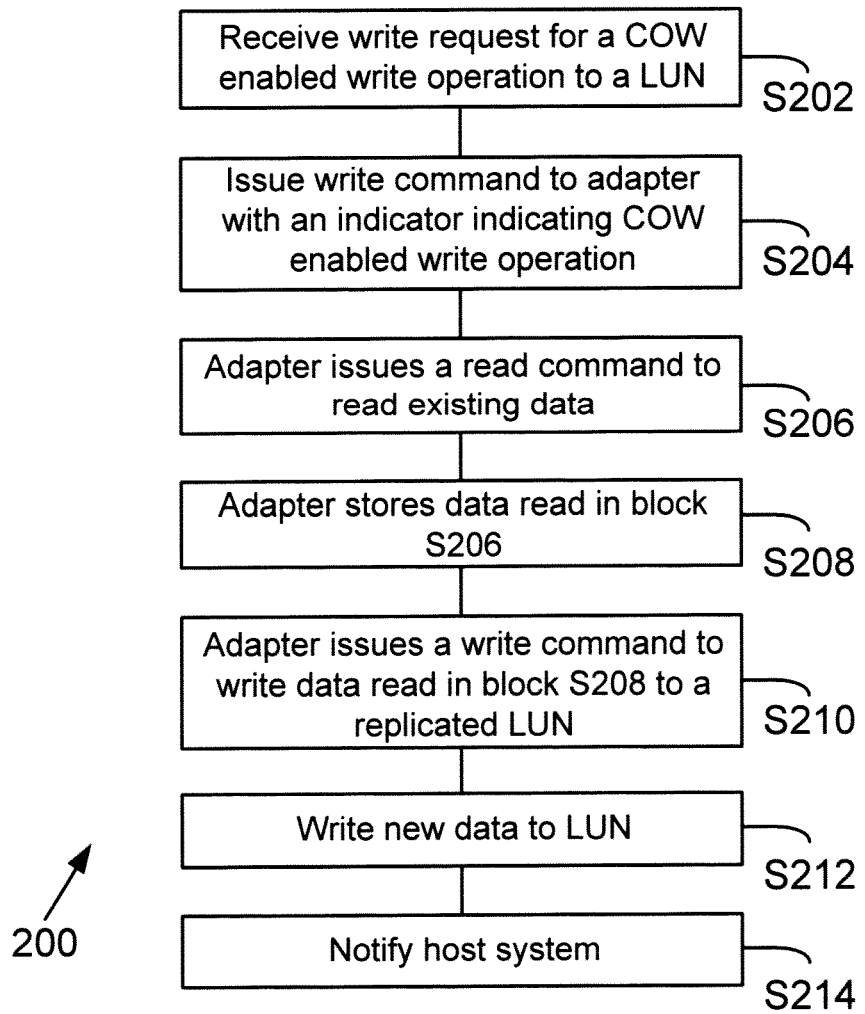
FIG. 2 shows a process flow diagram for processing copy on-write (COW) enabled write operations, according to one embodiment.

FIG. 2 shows a process 200 for processing a COW enabled write operation, according to one embodiment. The process begins in block S202 when the write command 62 is received by the I/O subsystem 60 to write to application LUN 66 and for which a replicated LUN (for example, 68) already exists.

In block S204, the I/O subsystem 60 issues a write command (for example, 70, FIG. 1C) to adapter 14. The command may include an indicator for example, a flag, to indicate to the adapter 14 that the command is for a COW enabled write operation.

In block S206, adapter 14 firmware issues a read request (for example, 72) to read data from application LUN 68. In block S208, the old data that is read by adapter 14 is temporarily stored by adapter 14.

In block S210, adapter 14 issues a write command 74 to write the old data at the replicated LUN 68. Adapter 14 uses LUN map 36B to obtain the LUN number and the WWPN of the target port managing replicated LUN 68. The write command 74 may be a SCSI command data block for writing the old data. It is noteworthy that in conventional systems, as described above, the host system prepares the write command for the adapter 14. In the embodiments disclosed herein, the adapter 14 maintains the LUN map 36B and hence is able to issue the write command to write the old data.

Thereafter, in block S212, adapter 14 issues a write command 76 to write the new data 78 to the application LUN 66. An interrupt is generated in block S214 to notify the application 58 that the write operation has been completed.

The embodiments disclosed herein save time and computing resources. Adapter 14 offloads various operations from computing system 12 for example; processing a COW enabled write operation. This allows the processing modules of computing system 12 to perform other tasks.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method for processing a write request for a copy on write (COW) enabled write operation to write information to a logical unit number (LUN) for which a replicated LUN exists, comprising:

receiving the write request and the information that needs to be written by an adapter coupled to a computing system and interfacing with the LUN and the replicated LUN, wherein the write request includes an indicator indicating that the write request is for the COW enabled write operation;

issuing, by the adapter, a read request to the LUN to read any previous information that is stored at a same location as the location for the write request from the LUN;

temporarily storing the previous information at a memory storage location of the adapter;

writing, by the adapter, the previous information to the replicated LUN and writing the information based on the write request to the LUN; wherein the adapter uses a LUN mapping data structure to obtain an identifier for the replicated LUN and an identifier of a target port used for accessing the replicated LUN; and generating an interrupt for the computing system indicating that the write request for the COW enabled write operation has been completed.

2. The method of claim 1, wherein the adapter is a converged adapter for handling both a storage protocol and a network protocol.

3. The method of claim 2, wherein the converged adapter is a Fibre Channel over Ethernet (FCoE) adapter.

4. The method of claim 1, wherein the adapter is a Fibre Channel adapter.

5. The method of claim 1, wherein the adapter is an iSCSI adapter.

6. The method of claim 1, wherein the adapter is a device capable of communicating with the computing system, the LUN and the replicated LUN.

7. A system, comprising:
a computing system interfacing with an adapter;
a logical unit number (LUN) presented to the computing system for writing information at a storage device via the adapter; and
a replicated LUN for storing a point in time copy of the LUN;
wherein the adapter is configured to (i) receive a write request with an indicator indicating that the write request is for the COW enabled write operation to write information to the LUN; (ii) issue a read request to the LUN to read any previous information that is stored at a same location as a location for the write request from the LUN; (iii) temporarily store the previous information at a memory storage location of the adapter; (iv) write the previous information to the replicated LUN, where the adapter uses a LUN mapping data structure to obtain an identifier for the replicated LUN and an identifier of a target port used for accessing the replicated LUN; (v) write the information based on the write request to the LUN; and (vi) generate an interrupt for the computing system indicating that the write request for the COW enabled write operation has been completed.

8. The system of claim 7, wherein the adapter is a converged adapter for handling both a storage protocol and a network protocol.

9. The system of claim 8, wherein the converged adapter is a Fibre Channel over Ethernet (FCoE) adapter.

10. The system of claim 7, wherein the adapter is a Fibre Channel adapter.

11. The system of claim 7, wherein the adapter is an iSCSI adapter.

12. The system of claim 7, wherein the adapter is a device capable of communicating with the computing system, the LUN and the replicated LUN.

13. A machine implemented method for processing a write request for a copy on write (COW) enabled write operation to write information to a logical unit number (LUN) for which a replicated LUN exists, comprising:

a device coupled to a computing system and interfacing with the LUN and the replicated LUN receiving the write request;

the device issuing a read request to the LUN to read any previous information that is stored at a same location as a location for the write request from the LUN;

the device writing the previous information to the replicated LUN after reading the previous information in response to the read request, where the devices uses a LUN mapping data structure to obtain an identifier for the replicated LUN and an identifier of a target port used for accessing the replicated LUN;

the device writing the information based on the write request to the LUN; and the device notifying the computing system indicating that the write request for the COW enabled write operation has been completed.

14. The method of claim 13, wherein the device is a converged adapter for handling both a storage protocol and a network protocol.

15. The method of claim 14, wherein the converged adapter is a Fibre Channel over Ethernet (FCoE) adapter.

16. The method of claim 13, wherein the device is a Fibre Channel host bus adapter.

17. The method of claim 13, wherein the adapter is an iSCSI host bus adapter.

18. The method of claim 13, wherein the device generates an interrupt to notify the computing system indicating that the write request has been completed.

19. The method of claim 13, wherein the device provides the previous information to the computing system via a direct memory access operation.

* * * * *